(12) United States Patent
Melin et al.

(10) Patent No.: US 6,664,662 B2
(45) Date of Patent: Dec. 16, 2003

(54) METHOD AND DEVICE FOR CONTROL OF AN AUXILIARY UNIT IN A MOTOR VEHICLE

(75) Inventors: Sven-Anders Melin, Sodertalje (SE); Jan Danielsson, Nykvarn (SE)

(73) Assignee: Scania CV Aktiebolag (publ) (SE)

( * ) Notice: Subject to any disclaimer, the term of this patent is extended or adjusted under 35 U.S.C. 154(b) by 95 days.

(21) Appl. No.: 09/792,924

(22) Filed: Feb. 26, 2001

(65) Prior Publication Data

US 2001/0017487 A1 Aug. 30, 2001

(30) Foreign Application Priority Data

Feb. 28, 2000 (SE) ................................. 0000638

(51) Int. Cl.[7] ................................. H02B 1/24
(52) U.S. Cl. ................. 307/116; 307/9.1; 307/10.1; 307/141
(58) Field of Search ................. 307/116, 141, 307/9.1, 10.1

(56) References Cited

U.S. PATENT DOCUMENTS 4,206,613 A * 6/1980 Shockley .................... 62/133

FOREIGN PATENT DOCUMENTS

JP           7332792     * 12/1995

* cited by examiner

Primary Examiner—Brian Sircus
Assistant Examiner—Robert L DeBeradinis
(74) Attorney, Agent, or Firm—Ostrolenk, Faber, Gerb & Soffen, LLP

(57) ABSTRACT

Method and device for controlling an auxiliary unit (10) in a motor vehicle by means of a device consisting of a control unit (40) and a switch (30) for switching the auxiliary unit on and off. To ensure the maintenance of an auxiliary unit of this type and to prolong its life using simple means, it is proposed, among other things, that the control unit (40) will repeatedly signal actions to be taken to a driver of the vehicle or directly to the switch. A first action is the switch-on of the switched-off auxiliary unit (10) at a specific point in time if it (the unit) has been switched off for a long period of at least some weeks. A second, succeeding action is the switch-off of the unit (10) switched on in the manner described, after a short period of at least some minutes.

13 Claims, 1 Drawing Sheet

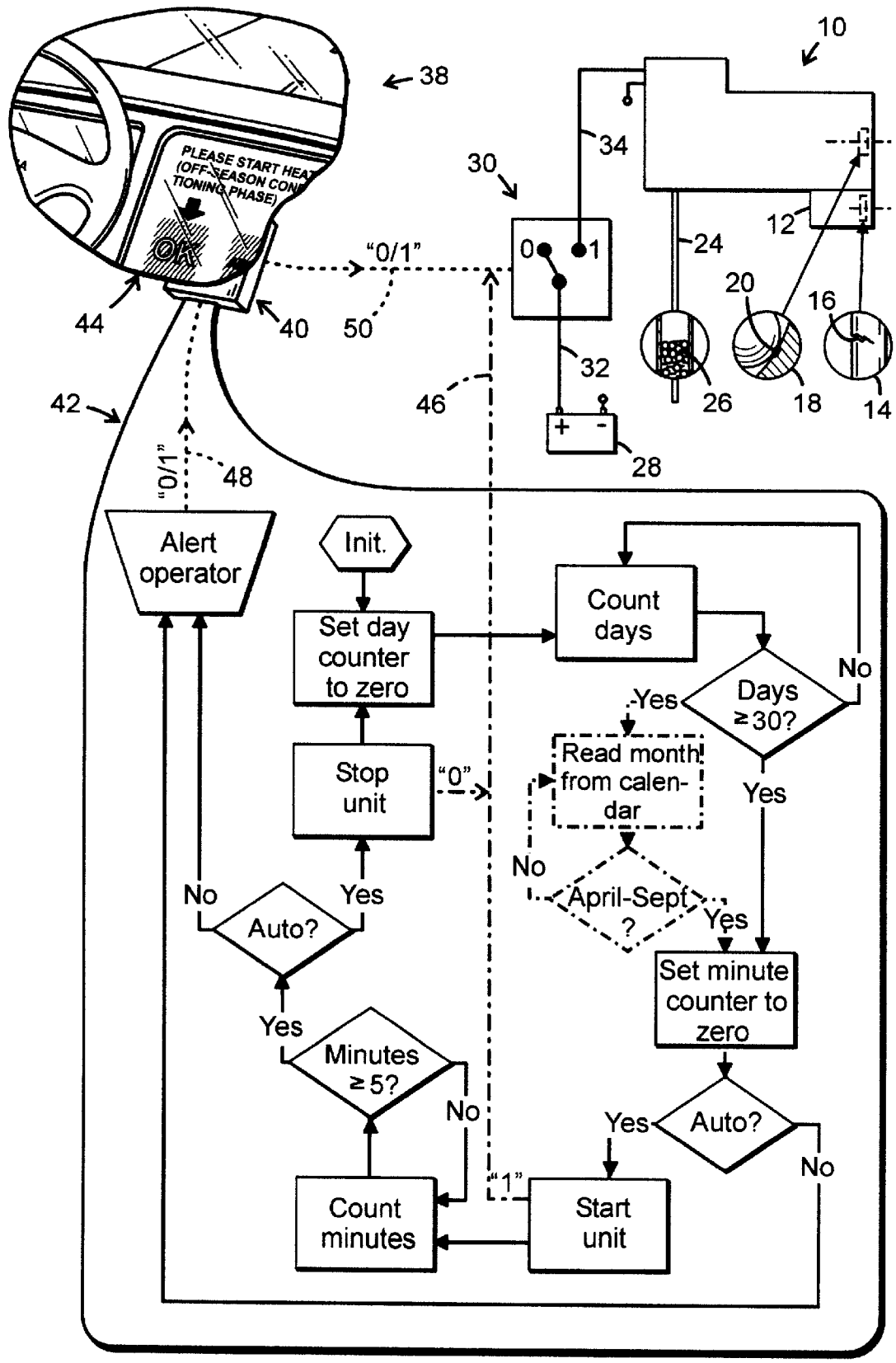

METHOD AND DEVICE FOR CONTROL OF AN AUXILIARY UNIT IN A MOTOR VEHICLE

TECHNOLOGY

The present invention relates to a method of controlling a mechanical auxiliary unit in a motor vehicle by means of a device consisting of a control unit and a switch for switching the unit on and off. The invention also relates to a device for implementing the said method.

STATE OF THE ART

Examples of mechanical auxiliary units of this nature include auxiliary heaters and air conditioning units. Units of this 'seasonal' type are used intensively during winter or summer periods and, thereafter, remain basically unused until the next period of use. The use of components which require maintenance to ensure their life is also a common feature of such units. In many cases, it is sufficient to operate the unit for a short period at regular intervals to condition these components, examples of which include seals and gaskets which must be exposed to fluids to prevent drying and ageing, non-friction bearings in which the metallic and line contacts must be shifted when the bearings are subjected to vibrations of long duration, such as in an internal combustion engine, and liquids which may thicken and cause blockages in lines, which may also dry out when the liquid level falls.

SUMMARY OF INVENTION

One purpose of the invention is to provide a method and a device of the type already described which, by simple means, can ensure the maintenance operation of auxiliary units, thereby preventing operating faults and prolonging the life of the unit.

In one aspect of the invention, the control unit includes a program designed to repeatedly signal the following steps:
switch-on of the unit when it is in the switched-off state at a particular point in time and has not been switched on for a long period of at least some weeks, and
switch-off of the unit switched on as described, after a short period of at least some minutes.

In one embodiment of the invention, the control unit program may be designed to deliver a switch-on signal only if the aforementioned specific point in time falls within a seasonal interval of at least some months.

Other characteristics and advantages of the invention are manifest from the embodiment description and from the patent claims.

Although it has long been known practice to equip an auxiliary heater, for example, with a timer function, it has not hitherto been realised that such a unit can be complemented easily with characteristics in accordance with the present invention.

BRIEF DESCRIPTION OF DRAWING

The single appended drawing is a schematic embodiment of the invention.

DESCRIPTION OF EMBODIMENT

On the drawing, a mechanical auxiliary unit in the form of an auxiliary heater for a motor vehicle is designated generally 10. However, the auxiliary unit may also be an air conditioning unit (not shown). In the example shown, the heater is a water heater consisting of a burner and a water pump 12 for circulating, in a known but not illustrated manner, water heated by the burner.

As shown on the drawing, an auxiliary unit of this type normally contains the following components: a seal 14, a non-friction bearing 18 and a fluid line 24. As already stated, components of this type require to be operated for short periods at regular intervals to avoid impairment of the operation and life of the auxiliary unit 10. In more specific terms, the seal material 16 may dry out and crack, an area of static metallic contact 20 may be subject to fretting corrosion due to vibrations and the level of fluids, such as diesel oil, in a supply line may fall, forming an agglomererate 26 which may block the flow. In the latter case, the burner may also fail to ignite if the fuel level in the line is allowed to fall excessively due to inevitable leakage—the distance between the fuel tank and burner in a typical heavy vehicle is approximately 5 meters. Furthermore, fluid lines of certain polymeric materials, as well as hose couplings, may deteriorate or age prematurely in the absence of fluid or due to the ingress of air.

A switch 30 is connected between the auxiliary unit 10 and a main battery 28 in the motor vehicle by means of supply cables 32, 34. In the example shown, the switch 30 is of the electronic type, such as an FET (Field-Effect Transistor) switch, which is switched to '1' (on) and '2' (off), as appropriate, by modulated signals from a control unit 40 in the motor vehicle. The control unit 40 is a programmed control unit, such as a microprocessor, and is equipped with a control program 42, which may be implemented in software or hardware form. The control unit 40 is also arranged, in a manner not shown in detail, to communicate with an operator interface 44 in the cab 38 of the motor vehicle. The interface 44 may, in addition to a display, include acoustic signal sensors and input devices, such as a keypad for on and off operation of the switch 30. The control unit 40 is provided, in a manner not shown in detail, with an output, such as a serial port, which is designed to transmit a '0' (off) or '1' (on) signal to the switch 30 via a signal lead 50. To facilitate understanding of the concept, the drawing also shows a proposed signal lead 46 from two program stages in the control program 42. The proposed signal lead 46 is designed to illustrate the embodiment of the invention in which control of the switch 30 is completely automatic, that is without operator intervention. In practice, these signals are also transmitted via signal lead 50.

The control program 42, which is shown in the form of a flow chart, is only one example intended to illustrate the principles of the invention. Thus, the number of program stages and their relative order may vary significantly from that shown on the drawing.

Closer study of the flow chart shows that the control unit 40 is arranged to deliver an 'on' signal to the switched-off auxiliary unit 10 when it (the unit) has been switched off for a long period of time. The auxiliary unit 10, now switched on as just described, is then arranged to be switched off after a short period of time which, in the example, is specified as 5 minutes. The optimum values of the longer and shorter time intervals may normally vary from unit to unit and should preferably be determined on the basis of recommendations of the manufacturer of the unit 10. In the case of an auxiliary heater, the longer interval may typically vary between one and two months, while the shorter interval may typically vary from a few minutes to about ten minutes.

As indicated by the dashed boxes on the flow chart, the control program 42 may, alternatively, be arranged to deliver on and off signals only during a specified seasonal interval. On the flow chart, the seasonal interval is shown, as an example only, as April to September and the longer interval as 30 days. If, as in the typical embodiment, the auxiliary unit 10 is a heater, the warm season, that is the period when the unit will seldom be in use, is specified as the seasonal interval.

As mentioned above, on/off control may, alternatively, be performed automatically or by the driver/operator of the vehicle. The flow chart indicates that control program 42 may include program stages which, depending on an overriding program setting, transmits the signals either to the operator interface 44 or directly to the switch 30. The setting may also incorporate mixed automatic and manual control so that the operator is alerted only when the unit 10 is to be started for maintenance operation, but not when it is to be stopped, which is controlled automatically. An overriding program setting of this type may be implemented conveniently when the unit has been installed in the vehicle.

The operator interface is naturally arranged so that the driver of the vehicle, independently of the program 42, can always start and stop the auxiliary unit as required outside of the specified seasonal interval and, if required, also within that interval.

What is claimed is:

1. A method of controlling an operable unit for initiating operation of the unit after a first time interval and concluding operation after a second time interval, the method comprising:

determining whether the operable unit has not been switched on during at least the first time interval and determining whether the first time interval falls within or outside a seasonal interval;

switching on the operable unit within the seasonal interval if it had not been switched on after the first time interval but not switching on the operable unit after the first time interval and outside the seasonal interval;

after passage of the second time interval, switching off the operable unit;

after switching off the operable unit, repeating the steps of the method.

2. The method of claim 1, wherein the operable unit is a mechanical auxiliary unit of a motor vehicle.

3. The method of claim 2, further comprising selectively manually switching on or off the operable unit during either of the first and the second time intervals.

4. The method of claim 3, wherein the first time interval is determined starting with the time that the operable unit is switched off after the second time interval.

5. The method of claim 3, wherein the manual switching is performed through an operator interface and the switching on after the first interval is transmitted automatically.

6. The method of claim 3, wherein the switching on is manual and the switching off is automatic after the second time interval.

7. The method of claim 1, further comprising moving a switch connected with the operable unit automatically between the switched on and switched off conditions upon passage of the first time interval and the second time interval, respectively.

8. The method of claim 1, wherein the first time interval has at least some weeks and the second interval has at least some minutes.

9. An apparatus for controlling an operable unit, the apparatus comprising:

a switch connected with the operable unit for selectively operating the unit and discontinuing the operation of the unit;

a control unit connected with the switch for operating the switch between the operating and discontinuing of operating conditions;

the control unit including a program which signals performance of the following actions:

determining whether the operable unit has not been switched on during at least a first time interval;

determining whether the first time interval falls within or outside a seasonal interval;

operating the switch switching on the operable unit if it had not been switched on after the first time interval by sending a signal for switching on the operable unit after the first time interval within the seasonal interval, but sending no signal for switching on the operable unit after the first time interval but outside the seasonal interval;

after passage of a second time interval, automatically operating the switch for switching off the operable unit;

after switching off the operable unit repeating the preceding steps.

10. The apparatus of claim 9, wherein the control unit is connected with the switch for operating the switch automatically without intervention of an operator for operating the operable unit after the first time interval and to discontinue operating the operable unit after the second time interval.

11. The apparatus of claim 9, wherein the operable unit is an auxiliary unit in a motor vehicle.

12. The device of claim 9, further comprising an operator interface also connected with the switch such that an operator can manually operate the switch to the operating unit.

13. The apparatus of claim 12, wherein the program includes an alert to an operator of the apparatus to operate the operator interface to operate the switch.

* * * * *